US011079909B2

(12) United States Patent
Muramoto et al.

(10) Patent No.: US 11,079,909 B2
(45) Date of Patent: Aug. 3, 2021

(54) MACRO BUILDING TOOL WITH AN INFORMATION PANE AND A MACRO BUILDING PANE FOR COMPILING AN ORDERED MACRO AND DETERMINING DATA DEPENDENCY

(71) Applicant: salesforce.com, inc., San Francisco, CA (US)

(72) Inventors: Kristen Noriko Muramoto, San Francisco, CA (US); Clément Jacques Antoine Tussiot, San Francisco, CA (US); Orjan Nils Kjellberg, Walnut Creek, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/785,068

(22) Filed: Oct. 16, 2017

(65) Prior Publication Data

US 2018/0181270 A1    Jun. 28, 2018

Related U.S. Application Data

(60) Provisional application No. 62/556,064, filed on Sep. 8, 2017, provisional application No. 62/438,890, filed on Dec. 23, 2016.

(51) Int. Cl.
| G06F 3/0484 | (2013.01) |
| G06F 3/0481 | (2013.01) |
| G06F 9/451 | (2018.01) |
| G06F 8/34 | (2018.01) |
| G06F 8/20 | (2018.01) |
| G06F 9/455 | (2018.01) |

(52) U.S. Cl.
CPC .......... *G06F 3/0484* (2013.01); *G06F 3/0481* (2013.01); *G06F 8/20* (2013.01); *G06F 8/34* (2013.01); *G06F 9/451* (2018.02); *G06F 9/45512* (2013.01)

(58) Field of Classification Search
CPC .......... G06F 3/0484; G06F 8/34; G06F 9/451; G06F 8/20; G06F 9/45512; G06F 3/0481
USPC ................................................ 717/113, 115
See application file for complete search history.

(56) References Cited

U.S. PATENT DOCUMENTS

2004/0194141 A1 * 9/2004 Sanders ............. H04N 5/44543
725/53
2008/0307388 A1 * 12/2008 Ralls ...................... G06F 9/451
717/115

(Continued)

*Primary Examiner* — Abdullah Al Kawsar
*Assistant Examiner* — Kenny Nguyen
(74) *Attorney, Agent, or Firm* — Sterne, Kessler, Goldstein & Fox P.L.L.C.

(57) ABSTRACT

Disclosed herein are system, method, and computer-readable storage medium embodiments for ordered macro building. An embodiment may include operations of displaying, via a user interface, a first user interface object and a second user interface object, populating a macro building pane comprising a first macro building object and a second macro building object, in response to the first user interface object receiving a first interaction and in response to the second user interface object receiving a second interaction, and compiling a macro with at least the first interaction and the second interaction, the first interaction being with a first application and the second interaction being with a second application.

16 Claims, 8 Drawing Sheets

(56) References Cited

U.S. PATENT DOCUMENTS

| | | | |
|---|---|---|---|
| 2009/0217008 A1* | 8/2009 | Sato | G06F 21/14 |
| | | | 712/221 |
| 2012/0005604 A1* | 1/2012 | Wirch | G06F 8/34 |
| | | | 715/765 |
| 2012/0023508 A1* | 1/2012 | Flores | G06Q 10/06 |
| | | | 719/328 |
| 2014/0137264 A1* | 5/2014 | Bilogrevic | G06F 21/54 |
| | | | 726/27 |
| 2015/0301849 A1* | 10/2015 | Du | G06F 9/50 |
| | | | 718/1 |
| 2017/0277516 A1* | 9/2017 | Grebnov | G06F 9/5072 |

* cited by examiner

US 11,079,909 B2

MACRO BUILDING TOOL WITH AN INFORMATION PANE AND A MACRO BUILDING PANE FOR COMPILING AN ORDERED MACRO AND DETERMINING DATA DEPENDENCY

CROSS-REFERENCE TO RELATED APPLICATIONS

This patent application claims priority to Provisional U.S. Patent Application Ser. No. 62/438,890, filed Dec. 23, 2016, and Provisional U.S. Patent Application Ser. No. 62/556,064, filed Sep. 8, 2017, all of which are hereby incorporated in their entirety.

BACKGROUND

Tools that allow for building macros do so in a variety of fashions. However, these tools typically require the user at least have knowledge of the platform or environment in which the macro is to be built. Often, knowledge of programming languages or text-based commands is required, or else the options for building the macro are very limited. Conventional graphical macro tools within a given environment, such as a web application, will often limit macros to commands that can be performed only for a single function or application in the given environment. This results in a lack of tools available to build macros according to a user's needs or preferences. If macros have limited features, control, and with fewer options unless more knowledge-intensive programming or scripting is used, then this leaves most users unable to create sufficient macros and negatively impacts user experience with the target platform or environment.

SUMMARY

Provided herein are system, apparatus, article of manufacture, method and/or computer program product embodiments, and/or combinations and sub-combinations thereof, for an ordered macro building tool.

An embodiment includes a computer implemented method for ordered macro building. The method may operate by displaying, by at least one processor, via a user interface (UI), a first UI object and a second UI object; populating, by the at least one processor, a macro building (MB) pane comprising a first MB object and a second MB object, in response to the first UI object receiving a first interaction and in response to the second UI object receiving a second interaction; and compiling, by the at least one processor, a macro, comprising the first interaction and the second interaction, wherein the first interaction is with a first application and wherein the second interaction is with a second application.

Another embodiment includes a system for ordered macro building. The system may include a memory and at least one processor coupled to the memory. The processor may be configured to display, via a user interface (UI), a first UI object and a second UI object; populate, a macro building (MB) pane comprising a first MB object and a second MB object, in response to the first UI object receiving a first interaction and in response to the second UI object receiving a second interaction; and compile, a macro, comprising the first interaction and the second interaction, wherein the first interaction is with a first application and wherein the second interaction is with a second application.

A further embodiment may include a non-transitory computer-readable device having instructions stored thereon that, when executed by at least one computing device, may cause the computing device to perform operations. The operations may include displaying, via a user interface (UI), a first UI object and a second UI object; populating a macro building (MB) pane comprising a first MB object and a second MB object, in response to the first UI object receiving a first interaction and in response to the second UI object receiving a second interaction; and compiling a macro, comprising the first interaction and the second interaction, wherein the first interaction is with a first application and wherein the second interaction is with a second application.

BRIEF DESCRIPTION OF THE DRAWINGS

The drawings are representative of embodiments of the invention. In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for implementing ordered macro building tools.

Figure 1:
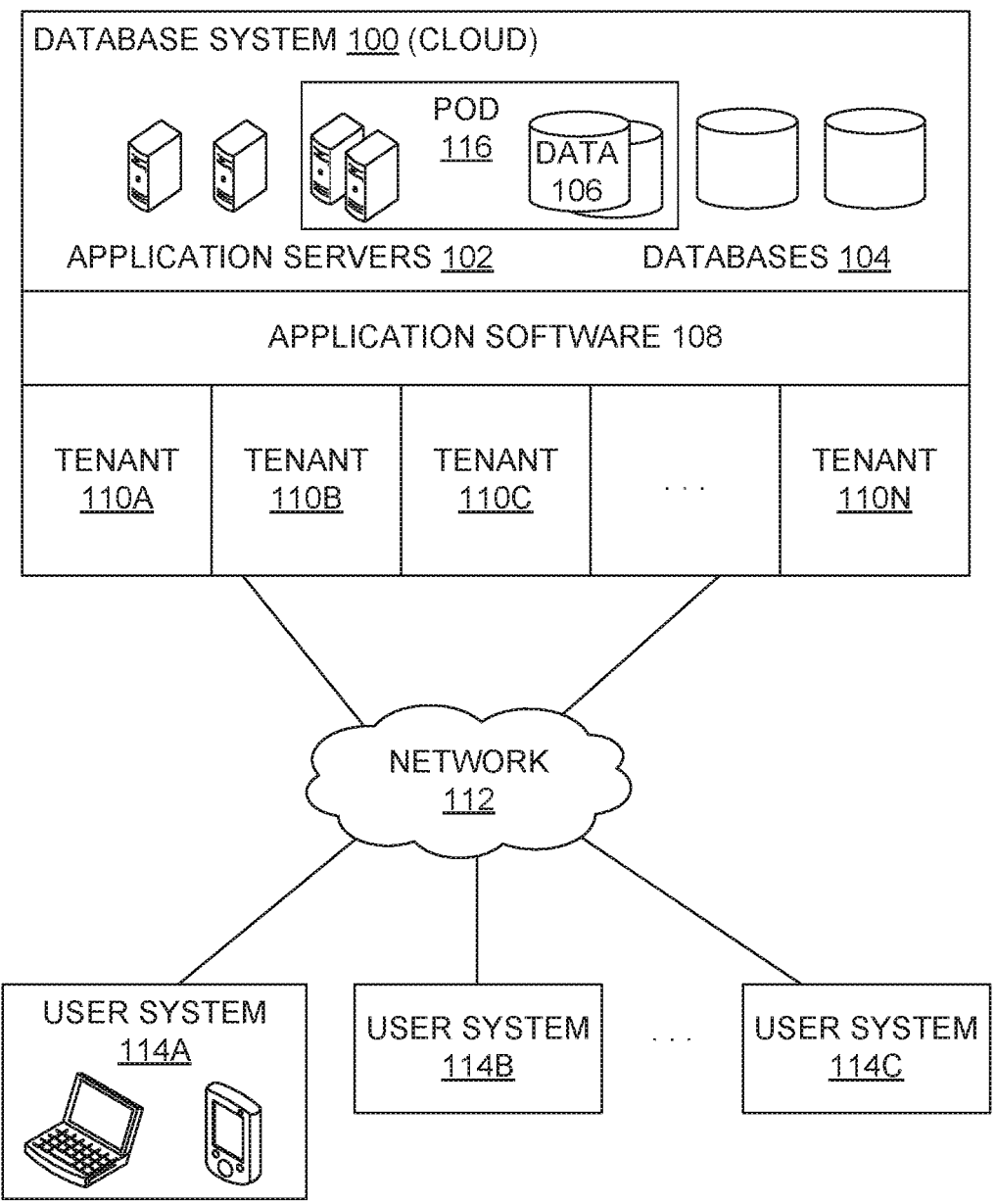
FIG. 1 is a diagram illustrating an example of a database system, according to an embodiment.

FIG. 1 shows an example database system 100 used in accordance with some embodiments. Database system 100 may include different application servers 102 and databases 104 connected together by networking equipment. Different combinations of application servers 102 and data servers may execute different application software 108 and may access data 106 stored in databases 104.

User systems 114 may connect to application servers 102 and databases 104 through a network 112. Network 112 and internal networks (not shown) connecting together application servers 102 and databases 104 may include local area networks (LANs), wide area networks (WANs), privately or publicly switched telephone networks (PSTNs), wireless (Wi-Fi) networks, cellular or mobile telecommunications networks, any other similar networks, or any combination thereof. Database system 100 and user systems 114 may operate within a private enterprise network, within a publicly accessible web-based network, such as via the Internet, or within any combination of the above.

User systems 114 may include personal computers (PCs), including workstations, laptop or notebook computers, tablet computers, handheld computing devices, cellular or mobile phones, smartphones, terminals, or any other device capable of accessing network 112 and database system 100. User systems 114 may use different protocols to communicate with database system 100 over network 112, such as Transmission Control Protocol and Internet Protocol (TCP/IP), Hypertext Transfer Protocol (HTTP), and/or File Transfer Protocol (FTP), to name a few non-limiting examples. In one example, user systems 114 may operate web browsers or applications that may send and receive HTTP messages to and from an HTTP server operating in database system 100.

Database system 100 in conjunction with application software 108 may provide an almost limitless variety of different services, such as providing software as a service (SaaS), platform as a service (PaaS), customer relationship management (CRM), enterprise resource planning (ERP), file sharing, web-based commerce or e-commerce, social networking, cloud-based computing and/or storage, any other similar service, or any combination thereof. Database system 100 and/or network 112 may be alternatively referred to as a cluster, cloud, and/or cloud-based computing system.

Multi-Tenant System

In one example, database system 100 and application software 108 may operate as a multi-tenant system 120 (MTS). A multi-tenant system refers to a database system where different hardware and software may be shared by one or more organizations represented as tenants (110A, 110B, 110C, . . . 110S; collectively "tenants 110"). For example, database system 100 may associate a first tenant 110A with an organization that sells airline services, associate a second tenant 110B with an organization that sells widgets, and associate a third tenant 108C with an organization that sells medical administration services. The multi-tenant system may effectively operate as multiple virtual databases each associated with one of tenants 110.

A pod 116 may include groups of application servers 102 and databases 104 that share an instance of the multi-tenant system. Different pods (other pods similar to pod 116, not shown) may operate independently but may share some processing and infrastructure equipment, such as routers (not shown) and storage area networks (SANs) (not shown). For example, tenants 110B and 110C may operate within pod 116 and a user associated with tenant 110C may use user system 114A to access the multi-tenant system operating in pod 116. User system 114A may send requests from the user to a load balancer (not shown) in pod 116. In response, the load balancer may forward the requests to one of application servers 102 within pod 116. Application server 102 may service the requests by executing application software 108 within pod 116 and/or accessing data 106 from databases 104 within pod 116 or from elsewhere as needed.

Database system 100 may include, for example, hundreds of pods like pod 116, and a database administrator may assign thousands of tenants 110 to the same pod 116, in an example embodiment. The database administrator may add new pods for servicing additional tenants 110 and/or may reassign any of tenants 110 to different pods. For example, one of tenants 110 may use a relatively large amount of processing bandwidth and/or use a relatively large amount of storage space. The database administrator may reassign that tenant, e.g., 110B, to a different pod with more processing bandwidth and/or storage capacity. Thus, the multi-tenant system may scale for practically any number of tenants and users.

Figure 2:
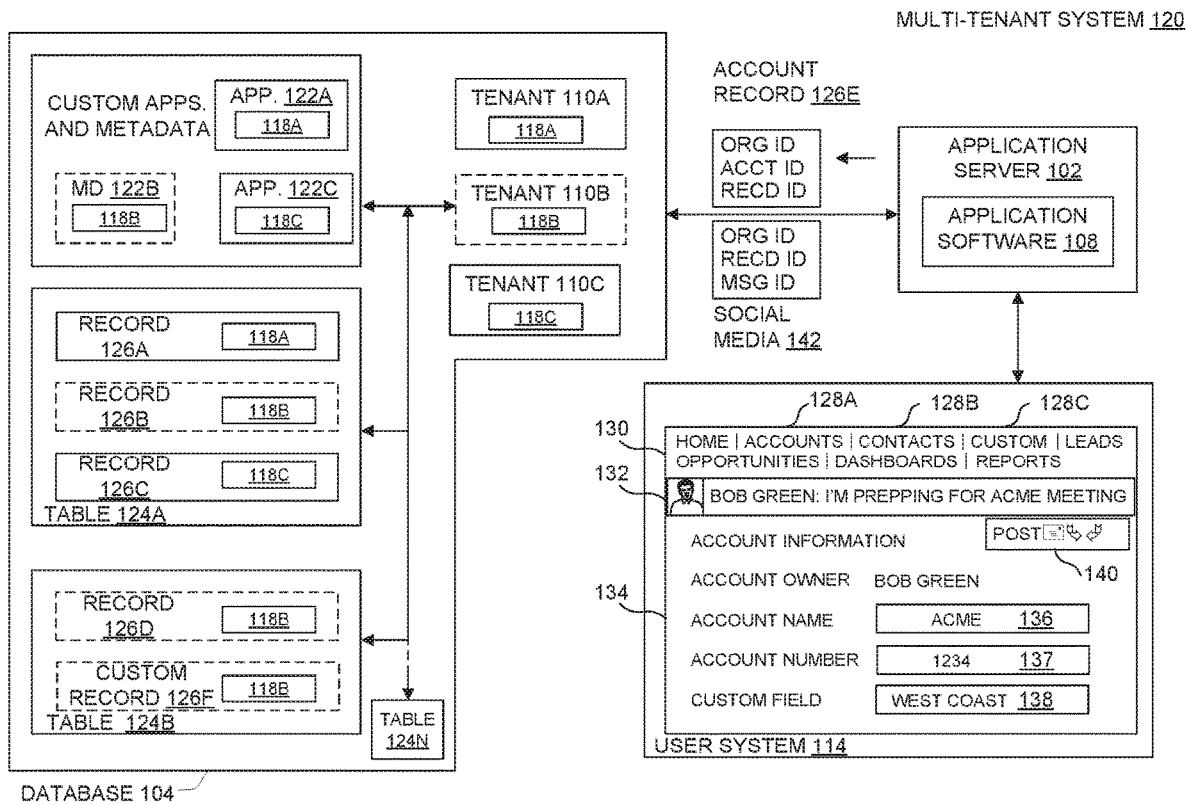
FIG. 2 is a diagram illustrating an example of a multi-tenant system, according to an embodiment.

FIG. 2 shows a platform for a multi-tenant system 120 that may operate within database system 100 of FIG. 1. Multi-tenant system 120 may comprise a collection of objects.

Objects may refer to entities such as users, tenants, accounts, contacts, leads, opportunities, reports, cases, files, documents, orders, price books, products, solutions, forecasts, or any other definable category. Objects also may refer to instances of the entities such as the data for the individual users, tenants, accounts, contacts, leads, opportunities, reports, cases, etc.

Objects also may refer to tables (124A, 124B, . . . 124N; collectively "tables 124") that include fields or a schema describing the entities. For example, table 124A may define fields for customer contacts such as name, address, phone number, fax number, etc. The same or another table 124B may define fields for purchase orders such as customer, product, sale price, date, etc.

Objects also may refer to records (126A, 126B, . . . , 126F, . . . , 126N (not shown); collectively "records 126") that contain data or instances for the entities and fields. For example, record 126A may contain the specific name, address, phone number, fax number, etc. for a particular customer contact and record 126C may contain the specific customer, product, sale price, and date for a particular purchase order.

Multi-tenant system 120 may use identifiers to maintain relationships between different objects. For example, application software 108 may assign unique organization identifiers (org ids) 118A, 118B, and 118C to tenants 110A, 110B, and 110C, respectively. Application software 108 then associates other objects with org ids 118.

For example, a user may log in to multi-tenant system 120 via user system 114. Application software 108 may access one of tables 124 that, for example, may associate a user's password, or (cryptographic) hash thereof, with a specific tenant, e.g., 110B. Application software 108 may then identify different records 126B, 126D, and 126F associated with org id 118B and may display data from records 126B, 126D, and 126F to the user via user system 114. Application programming interfaces (APIs) also may access data in multi-tenant system 120 via user system 114 in a manner similar to user login access in order to maintain similar security protocols and access privileges.

In one example, application software 108 may display a toolbar 130 (alternatively called a menu bar) identifying different entities 128 associated with tenant 110B. The user may select tabs in toolbar 130 to view, edit, and/or create instances (data) of entities 128. For example, the user may select a tab associated with accounts entity 128A and select options for creating a new account 134. The user enters data for new account 134 into fields 136 and application software 108 creates a record 126E containing the data. Application software 108 assigns record 126E org id 118B for tenant B, an account identifier (acct id), and a record identifier (recd id) before storing record 126E in one of tables 124.

Multi-tenant system 120 may establish relationships between different entities 128. For example, the user may associate different contacts 128B with account 134. The user may select a tab in toolbar 130 associated with contacts 128B and enter contact information for a customer. Application software 108 may create another record containing the contact information that includes the record id for account 134. Users accessing account 134 may then also view associated contacts 128B.

Multi-tenant system 120 enable users to create custom metadata 122B for tenant specific functions, objects, entities, categories, and/or data. For example, an administrator for tenant 110B, or a third party vendor, may create a custom entity 128C with a unique combination of fields 136 and 138. Application software 108 may create metadata 122B defining custom entity 128C and may then access metadata 122B enabling users for tenant 110B to view, edit, and create custom records 126F for custom entity 128C, in this non-limiting example.

Multi-tenant system 120 also enable users to create and execute custom application software 122A and 122C. For example, the organization associated with tenant 110C may provide medical administration services. The administrator for tenant 110C, or a third party vendor, may create custom application software 122C that may generate medical reports and/or manage medical records. Application software 108 may associate custom application software with org id 118C, which may allow users for tenant 110C to access custom application software 122C, and thereby also may generate the medical reports and/or manage the medical records.

In some embodiments, multi-tenant system 120 may associate users with user profiles and assign the users unique user identifiers (user ids). The user profiles may include a collection of data about a user, such as a name, a title, a phone number, a photo, a biographical summary, and/or a status, to name a few non-limiting examples. Multi-tenant system 120 also may associate users with permissions profiles that determine which records 126 and application software 108 and/or other custom applications (e.g., 122A, 122C, 122N (not shown); collectively 122) specific users may access. For example, a permissions profile for a first user may allow access to data and software for a salesperson and a permissions profile for a second user may allow access to data and software for an administrator.

A group may refer to a collection of users within an organization. In some embodiments, a group may include users with a similar attribute or a similar membership or subscription. Multi-tenant system 120 may assign groups of users unique group identifiers (group ids) and provide the groups various visibilities. For example, some groups may be private, while others may be public. To become a member within a private group, users may request subscription to the group, requiring acceptance by an administrator or group owner.

Social Networks

Multi-tenant system 120 may associate social media with different records 126. For example, a user may select an icon 140 to post feed items 132 (messages) relating to account 134. Application software 108 may generate social media data that may include feed item 132, org id 118B for tenant 110B, the record identifier for account 134, and unique message identifier (msg id). Users associated with tenant 110B, in this example, may then access account 134, view associated feed item 132, and create other related messages. For example, another user may access account 134 and post a comment to feed item 132. Application software 108 may create additional social media data that may include a comment, org id 118B for tenant 110B, and the msg id for feed item 132 (message). Thus, users accessing account 134 may not only view, edit, and/or create account 134, but also may view social media, such as feed item 132 and/or associated account 134, as well as post additional messages to a private or public account and/or to a private or public feed, in this non-limiting example.

Feed items 132 may be alternatively referred to as messages, and they may include any type of information viewable in a feed, such as user-generated textual posts or comments, documents, audio data, image data, video data, or any other type of data. Feed items 132 may include links or attach to other documents or files. Feed items 132 may be associated via identifiers with one or more objects, entities, users, groups, records, or other feeds. Multi-tenant system 120 also may transmit email notifications or other types of network communications to users associated with any object, entity, group, record, or feed. Messages or feed items may alternatively be system-generated, based on system or user parameters. Messages or feed items may additionally be generated by scripts, artificial intelligence (AI) bots, or other automated processes via an application programming interface (API), rather than by users' personal actions.

More details regarding database system 100, multi-tenant system 120, and social networks are described in U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010; U.S. Pat. No. 7,779,039, titled CUSTOM ENTITIES AND FIELDS IN A MULTI-TENANT DATABASE SYSTEM, by Weissman et al., issued on Aug. 17, 2010; and U.S. Pat. No. 8,478,722, titled ENTERPRISE LEVEL BUSINESS INFORMATION NETWORKING FOR CHANGES IN A DATABASE, by Peter Lee et al., issued on Jul. 2, 2013, all of which are hereby incorporated by reference in their entirety and for all purposes.

Figure 3:
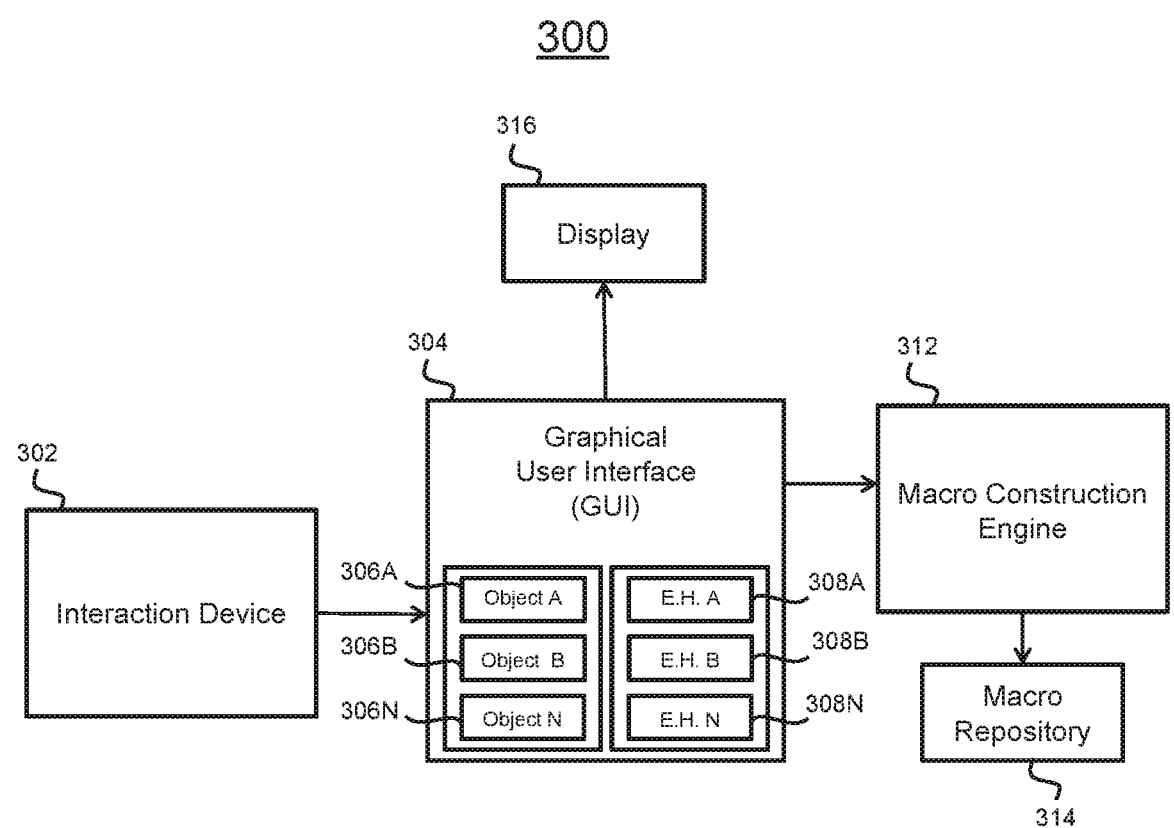
FIG. 3 is a diagram illustrating an example of an ordered interactive macro building system, according to an embodiment.

FIG. 3 is a diagram illustrating an example of an ordered interactive macro building system, according to an embodiment. In an embodiment, ordered interactive macro building system 300 may comprise one or more interaction devices 302, at least one graphical user interface (GUI) 304, macro construction engine 312, macro repository 314, and display 316.

According to another embodiment, ordered interactive macro building system 300 may construct macros for a system according to interactions with GUI 304.

In an embodiment, GUI 304 may comprise one or more GUI objects (306A, 306B, . . . 306C; collectively "GUI objects 306"), one or more event handlers (308A, 308B, . . . 308N; collectively "event handlers 308"), and memory 310. GUI objects 306 may encompass interactive objects, such as information windows, interactive buttons, sliders, text boxes, interactive images, or any combination thereof, to name a few non-limiting examples. GUI 304 may include any number of GUI objects 306, for example, from 0 to N GUI objects.

According to an embodiment, GUI objects 306 may be written in any computer language, such as C C, C++, C#, Objective-C, Java, Swift, Go, Ruby, Perl, Python, JavaScript, Visual Basic, WebAssembly, or any combination thereof, to name a few non-limiting examples. In an embodiment, GUI 304 may be displayed on display 316. Display 316 may include one or more computer monitors, tablet screens, televisions, smartphone screens, or any combination thereof, to name a few non-limiting examples.

According to an embodiment, each GUI objects 306 may be associated with a respective event handler 308. For example, GUI object A 306A may be associated with event handler A 308A, GUI object B 306B may be associated with event handler B 308B, and GUI object N 306C may be associated with event handler N 308C. Event handlers 308 may comprise callback routines for handling received interactions with respective GUI objects 306. For example, event handler A 308A may comprise a callback routine handling received interaction for GUI object A 306A. According to an embodiment, event handlers 308 may be written in any computer language, such as C, C++, C#, Objective-C, Java, Swift, Go, Ruby, Perl, Python, JavaScript, Visual Basic, WebAssembly, or any combination thereof, to name a few non-limiting examples.

In an embodiment, GUI objects 306 and event handlers 308 may be stored in memory 310. Memory 310 may encompass a random access memory (RAM), read-only memory (ROM), electronically erasable programmable random access memory (EEPROM), hard disk drive (HDD), solid state drive (SSD), or any combination thereof, to name a few non-limiting examples.

According to an embodiment, GUI 304 may receive interactions from interaction device 302. Interaction device 302 may encompass a computer keyboard, a mouse, a smart phone, a tablet, a touch screen, or any combination thereof, to name a few non-limiting examples. In an embodiment, GUI 304 may receive interactions from interaction device 302 as interactions with GUI objects 306. These interactions may include typing of text, mouse clicks, mouse drags, gestures using a pointing device or touch device, swipes on a touch pad or touch screen, voice commands, text commands, scripts, or any combination thereof, to name a few non-limiting examples.

Figure 5:
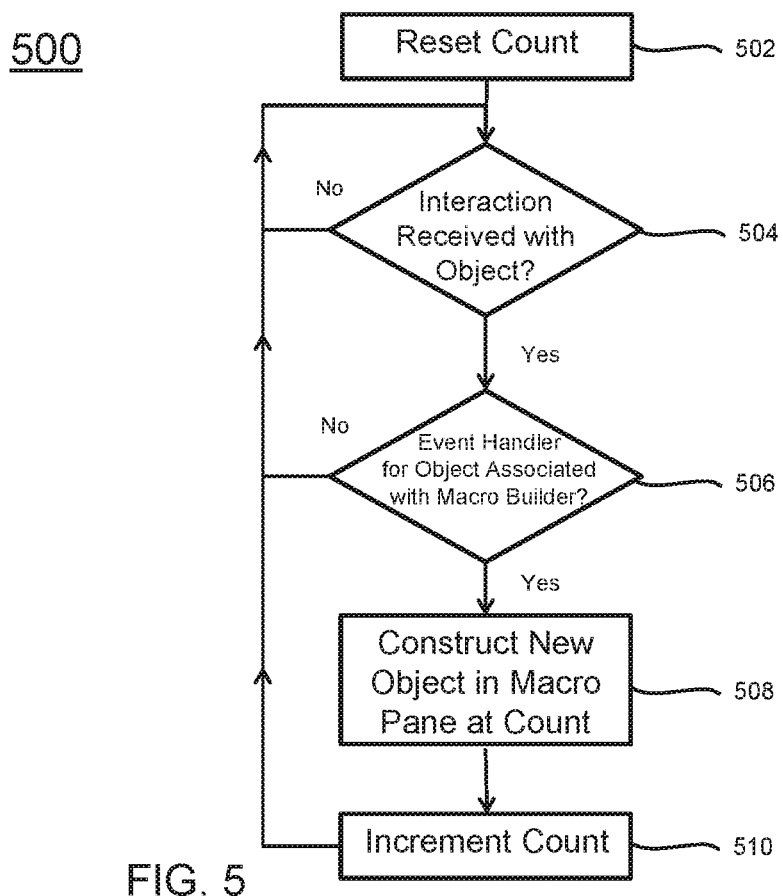
FIG. 5 is a flowchart illustrating a process for ordered interactive macro building, according to an embodiment.

In an embodiment, when GUI 304 receives an interaction with a GUI object 306, the respective event handler 308 for the GUI object 306 may create or populate a macro building pane within GUI 304, as detailed in the discussion of FIG. 5. According to an embodiment, GUI 304 may also receive interactions with the macro building pane from interaction device 302. These interactions may include typing of text, mouse clicks, mouse drags, gestures on a touch screen, swipes, voice commands, text commands, scripts, or any combination thereof, to name a few non-limiting examples. GUI 304 may send the received interactions with the macro building pane to macro construction engine 312.

Unlike conventional macro builders that record events for only one entity (such as a single program or application), the presently disclosed macro building system may be implemented as a general orchestrator framework across a platform of various applications that may be interconnected. Additionally, options of macro building objects, instructions, actions, etc., may be dynamically presented based on inputs, context, and/or data dependencies, as well as random generation. This level of flexibility allows for a cross-application framework to build macros for virtually any use case supported by a given platform or service (e.g., SaaS, PaaS, etc.). Additional information on these concepts is described below with respect to FIG. 7.

Figure 6:
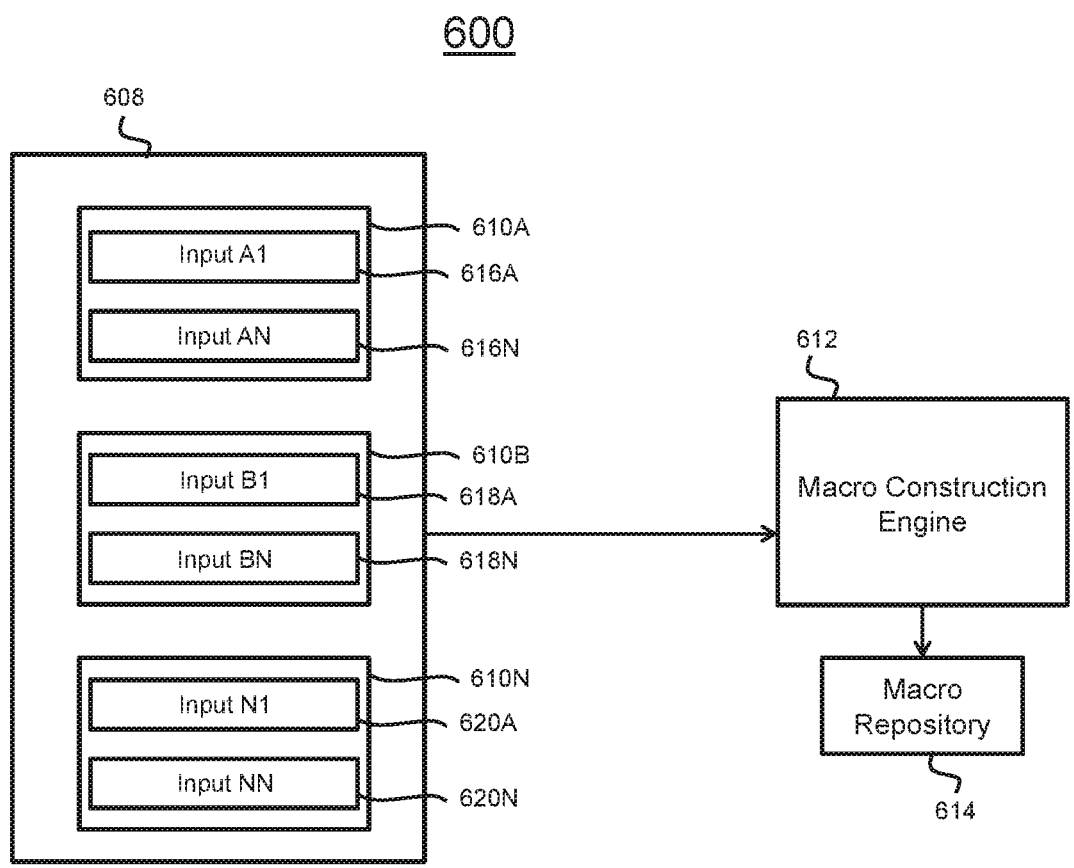
FIG. 6 is a diagram illustrating a macro building system, according to an embodiment.

According to an embodiment, macro construction engine 312 may create macros according to the interactions sent from GUI 304, as detailed in the discussion of FIGS. 3 and 6. Macro construction engine 312 may include a macro builder, compiler, decompiler, debugger, or any combination thereof, to name a few non-limiting examples. In an embodiment, macro construction engine 312 may construct macros in any computer language such as C, C++, C#, Objective-C, Java, Swift, Go, Ruby, Perl, Python, JavaScript, Visual Basic, WebAssembly, or any combination thereof, to name a few non-limiting examples.

In some embodiments, any macro may be composed of a plurality of instructions, and each instruction may have at least one operation and may have any number of components, from 0 to N components. Any acceptable or required operations and/or components for any given macro instruction may be published in a specification such as for an API.

In one purely illustrative embodiment, each macro building object 610 of FIG. 6 may correspond to an instruction, inputs 616A, 618A, and 620A may each correspond to an operation (action), and any number of other inputs through 616N, 618N, and 620N may correspond to any other operations and/or components. A macro may encompass practically any number of instructions.

To provide more illustrative real-world examples, a user may create a macro to generate and fill forms, such as for contracts. There may be an instruction (which may be handled internally as a command) including an operation or action to create a blank form, which, in some embodiments, may not need any other components (which may be handled internally as arguments to the command). There may be a further instruction with an operation or action to populate the blank form with specific form fields, such as for a specific type of contract, e.g., for sale of a specific type of product or service, etc.

Here, the arrangement of form fields may be a component, which may be handled internally as a file, or a reference to existing data, such as stored in another file or library specifying the form fields required in this instance. A reference to existing data may be a pointer, pathname, locator, URI, etc. Further, there may be another instruction with an operation or action to fill the form fields with specific values, such as for a specific product model, service provider, and/or customer, in this non-limiting example.

This data of values to fill the form fields may be designated for manual entry upon replay of the macro, or may alternatively be another component loaded or referenced from another source of data. The macro may additionally specify yet another step after having populated and filled the fields, such as saving the finished contract to a file in a specified storage location, printing the contract to paper, loading the contract in an electronic signature terminal or website, etc., or any combination thereof.

As described in the example above, operations may be generic and basic, simply allowing a macro builder user to select different components or further actions, such as selecting, creating/generating, filling, or submitting values in a form, to name a few non-limiting examples. Also, as should be apparent from the above example, the order of the macro instructions may be crucial, in at least some use cases, at least because of data dependencies. For example, the form fields may not be available to be filled with values before they are populated.

Given that some orders of instructions may be required in certain situations, and for any number of other reasons, each macro may need to be validated at least once at some point. Macros may, in some embodiments, be validated at least when stored, if not also when created, recalled or (re)loaded, and/or replayed, etc. If any part of the system, such as macro construction engine 312 or macro repository 314, determines that a macro or any part thereof (any instruction, operation/action, and/or component) is out of order or otherwise invalid (such as during a validation step or process), then an error may be raised, which may in turn trigger a message or notification to a user, and/or may result in reloading the macro builder (ordered macro building tool) to correct the error.

Similarly, the validation step or process may further include an optimization routine, in which combinations of macro instructions, operations or actions, may be checked against other operations or known functions in the system, to determine whether the macro coincides with an existing function in GUI 402. For example, a single existing function or existing macro could achieve the same (or acceptably similar) result as a custom macro built by a user. In this case, if such functionality is discovered in the optimization routine, a warning may be raised, which may in turn trigger a message or notification to a user, and/or may result in reloading the macro builder (ordered macro building tool) to remedy the warning, or instructing the user to use the existing function instead of the custom macro.

In some embodiments, such optimization routines may be performed in real time while the macro builder is being used, per interactive user guidance in the macro builder, as opposed to a validation step or process performed on stored macros. Such guidance may include dialog boxes, popup or banner messages, voice prompts, other external prompts, and so on, as would be understood by a person skilled in the art. In other embodiments, any combination of the above optimizations and validations may be possible at any stage of building, accessing, and using macros in compatible systems, environments, or platforms.

Per an example embodiment, as macros are built, macro instructions, components, GUI elements, and any other necessary information may be serialized in real time using a format, e.g., JSON, character streams, binary streams, or other standard on non-standard formats, to name a few non-limiting examples. The serialized macro may be held in memory or transmitted via a network, bus, or other communication path or infrastructure. In an example embodiment, once a macro is finished being built using the macro builder, the macro may be saved, in which case the serialized macro information may be committed to storage, such as local storage or remote storage, on a backend server, in a cloud, network share, removable medium, or any other persistent storage that a person of ordinary skill in the art would appreciate.

When committing the macro to persistent storage, in some embodiments, the macro may be stored according to a data model, which may also be specified and/or published in an API, for example. Instructions and data that compose the macro may be converted to a different format, e.g., XML, custom key-value pairs, human-readable configuration files, or machine-readable binary formats, standard or non-standard, etc. The stored macro should be accessible to any compatible function or application within the framework(s), environment(s), or system(s) supporting similar macros, whether or not they were built using the macro builder (ordered macro building tool) disclosed herein.

In an embodiment, macro construction engine 312 may store any constructed macros in macro repository 314. Macro repository 314 may include a random access memory (RAM), read-only memory (ROM), electronically erasable programmable random access memory (EEPROM), hard disk drive (MD), solid state drive (SSD), or any combination thereof, to name a few non-limiting examples. According to an embodiment, constructed macros stored in macro repository 314 may be queried, recalled, replayed, edited, deleted, or any combination thereof, from macro repository 314.

Figure 4:
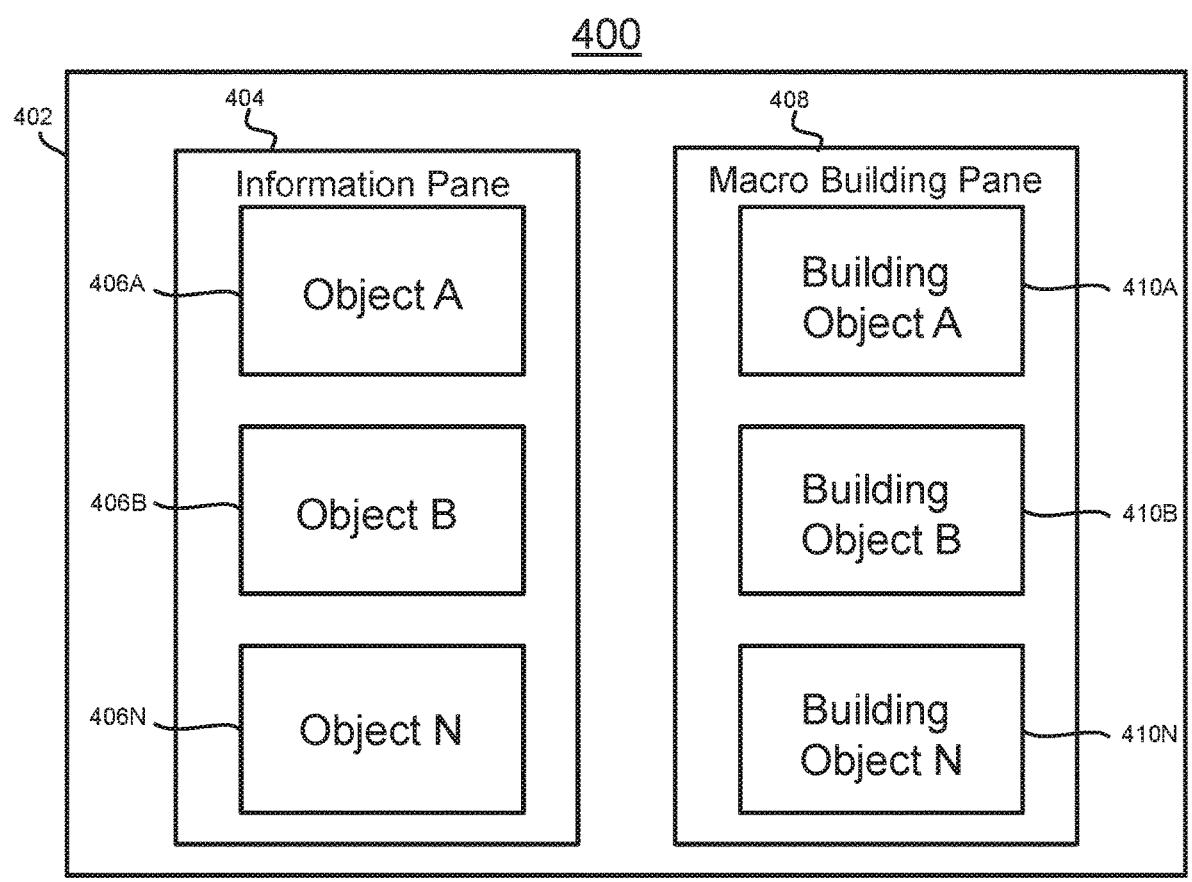
FIG. 4 is a diagram illustrating an example graphic user interface for ordered interactive macro building, according to an embodiment.

FIG. 4 is a diagram illustrating an example GUI for ordered interactive macro building, according to an embodiment.

According to an embodiment, a GUI 402 for ordered interactive macro building may include information pane 404 and macro building pane 408, all as part of macro building system 400. In an embodiment, information pane 404 may comprise GUI objects 406 (GUI object 406A, GUI object 406B, . . . GUI object 406N, or any combination thereof; collectively "GUI objects 406"). GUI objects 406 may include interactive objects that present types of data. These types of data may encompass e-mail, alerts, calendars, appointments, documents, alarms, or any combination thereof, to name a few non-limiting examples. In an embodiment, interaction device 302 may interact with GUI objects 406. Such interactions may include mouse clicks, mouse drags, gestures using a pointing device or touch device, swipes on a touch pad or touch screen, voice commands, text commands, scripts, or any combination thereof, to name a few non-limiting examples. According to an embodiment, information pane 404 may include any number of GUI objects 406, such as, for example, from 0 to N GUI objects 406.

In an embodiment, GUI 402 may receive an interaction with GUI objects 406 from interaction device 302, as discussed in FIG. 3. According to an embodiment, when a GUI object 406 receives an interaction, event handlers (such as, for example, event handlers 308), associated with GUI objects 406, may create, populate (such as, for example, with at least one macro building object 410), close—or any combination thereof—macro building pane 408. For example, GUI 402 may receive an interaction with GUI object A 406A from interaction device 302. An event handler (not shown) associated with GUI object A 406A may then create macro building pane 408 in GUI 402 and populate macro building pane 408 with macro building object 410A.

According to an embodiment, macro building pane 408 may include macro building objects 410 (macro building object 410A, macro building object 410B, . . . macro building object 410N, or any combination thereof; collectively "macro building objects 410"). Macro building objects 410 may encompass interactive objects for building macros. These interactive objects may include text boxes, buttons, command lines, sliders, or any combination thereof—to name a few non-limiting examples—that prompt information to build a macro. For example, building object 410A may comprise a text box prompting information for a macro to be built. According to an embodiment, macro building pane 408 may include any number of macro building objects 410, such as, for example, 0 to N macro building objects 410.

The prompting may involve any level of detail that the macro building system 300 or 400 may have been designed to handle. For example, for users such as supervisors, third-party agents, secretaries, etc., to name a few non-limiting examples, as persons who may not know (nor be expected to know) the extent of functions on the system or how to program macros, GUI 402 and/or macro building pane 408 itself, in some example embodiments, may provide guidance at various levels of detail to assist a low-knowledge user in selecting functions and determining their specific use(s) in a given macro. Additionally, during building of a macro, if the system determines that a user is attempting to create a new macro to perform a function for which an existing macro or pre-programmed function in the system may already be available, such guidance may notify the user of available alternative, in order to save additional work.

In an embodiment, macro building objects 410 may prompt information for a macro to be built for the type of information displayed by a related GUI object 406. As discussed with respect to FIG. 3, types of data that may be displayed by GUI objects 406 may include e-mail, alerts, calendars, appointments, documents, alarms, or any combination thereof, to name a few non-limiting examples. The relationship between a GUI object 406 and a macro building object 410 may include any of: the GUI object 406 interacted with when a respective macro building object 410 was populated into macro building pane 408, the type of information displayed by the GUI object 406 and macro building object 410, the order in which the GUI object 406 and macro building object 410 may be displayed, or any combination thereof, to name a few non-limiting examples. For example, GUI 402 may receive an interaction with GUI object B 406B, in which macro building pane 408 may be created and populated with macro building object B 410B. Macro building object B 410B may then display a prompt for information to build a macro for the type of information displayed by GUI object B 406B.

According to an embodiment, macro building objects 410 may be displayed within macro building pane 408 in a determined order. This determined order may be based upon a type of information prompted by any of macro building objects 410A-410C, an order in which the macro building objects, e.g., 410A-410C, were populated into macro building pane 408, an order specified by a user, an order of related GUI objects 406, or any combination thereof, to name a few non-limiting examples. Certain orders of elements, instructions, operations, components, etc., may also be forced by data dependencies or similar dependencies, of which a user may be notified or guided, as further described herein.

FIG. 5 is a flowchart illustrating a process for ordered interactive macro building, according to an embodiment.

At 502, a count may be reset, or set to zero (0), in an exemplary embodiment. This count may represent a place in an order for which macro building objects 410A-410C may be displayed. As an example, a macro building object 410 associated with a count of 0 may be first in the order, a count of 1 may be second in the order, and a count of N−1 may be Nth in the order. The order may include sequences or sub-sequences of vertical or horizontal positioning of graphical or textual macro building objects 410A-410C within macro building pane 408, numerical sequencing associated macro building objects 410A-410C, or any combination thereof. Execution may then advance to 504.

At 504, the system may determine whether an interaction with a GUI object 406 has been received, as discussed with respect to FIG. 4. If no interaction with a GUI object 406 has been received, then execution may repeat at 504; otherwise execution may then advance to 506. For example, assuming that GUI 402 receives an interaction with GUI object 406A from interaction device 302, then execution may advance to 506, because an interaction with a GUI object 406 has been received, in an embodiment.

At 506, the system may determine whether an event handler 308 associated with the interacted GUI object 406 is also associated with the macro builder (not shown), such as if a user designates the event handler 308 as part of a macro, in an example embodiment. If the event handler 308 associated with the interacted GUI object 406 is associated with the macro builder, execution may advance to 508; otherwise 504 may be repeated. As discussed in FIG. 3, each GUI object 406 may be associated with a respective event handler 308, in some embodiments. As discussed in FIG. 4, when an associated GUI object 406 is interacted with, an event handler 308 may create, populate, close, or any combination thereof, macro building pane 408. In an embodiment, if event handlers 308 create, populate, close, or any combination thereof, macro building pane 408, then they may be associated with the macro builder. For example, assume that GUI 402 receives an interaction with GUI object A 406A from interaction device 302. Event handler A 308A may be associated with GUI object A 406A and may comprise a command to create and populate macro building pane 408. Because the event handler 308 associated with the associated GUI object 406 is also associated with the macro builder, execution may then advance on to 508.

At 508, the event handler 308 associated with the interacted GUI object 406 may build (populate) macro building pane 408 with macro building objects 410. According to an embodiment, the macro building object 410 may be related to the interacted GUI objects 406, such as any combination of 406A, 406B, 406C, and so on through 406N, as discussed in FIG. 4. In an embodiment, the macro building object 410 may be in a position in an order according to the count. For example, if the count is 0, the macro building object may have a position of 0, or the first position, within the order. At 510, the count may be incremented, or increased by 1, in some embodiments.

As a non-limiting example of the process illustrated in FIG. 5, GUI 402 may comprise a user interface to be published, such as via a public API or similar interface specification, in some example embodiments. Such APIs or specifications may include GUI objects 406, such as GUI object A 406A (e.g., an object displaying e-mail information, in this example embodiment), GUI object B 406B (e.g., an object displaying contact information, in this example embodiment), and GUI object N 406C (e.g., an object displaying event alerts, in this example embodiment).

GUI 402 may receive an interaction with GUI object A 406A (e.g., displaying e-mail information) from interaction device 302 (such as, for example, a mouse click on GUI object A 306A from a mouse). Assuming that the macro building object A 410A associated with GUI object A 406A includes a command to populate macro building pane 408 with a macro building object 410, then once GUI 402 receives the interaction with GUI object A 406A, one of macro building objects 410 associated with GUI object A 406A (such as macro building object A 410A) may populate macro building pane 408 with macro building object A 410A. Macro building object A 410A may encompass an interactive object prompting information to build a macro for the corresponding GUI object A 406A. As in this non-limiting example, macro building object A 410A may encompass an interactive object prompting information to build a macro for processing or composing e-mail, as will be further discussed below with respect to FIG. 7.

FIG. 6 is a diagram illustrating a macro building system, according to an embodiment.

According to an example embodiment, macro building system 600 may build macros according to interactions with macro building objects 410.

In an embodiment, macro building system 600 may comprise macro building pane 608, macro building objects 610 (comprising, for example, macro building object A 610A, macro building object B 610B, and macro building object N 610N), macro construction engine 612, and macro repository 614.

According to an embodiment, macro building pane 608 may comprise a pane within a GUI (such as GUI 402) displaying macro building objects 610. In an embodiment, macro building pane 608 may comprise any number of macro building objects 610, such as for example, from 0 to N. As discussed in FIG. 4, macro building objects 610 may comprise interactive objects prompting information for a macro to be built. Each macro building object 610 may comprise a plurality of inputs for the information. For example, macro building object A 610A may comprise input A1 616A, input AN 616N, or any combination thereof, macro building object B 610B may comprise input B1 618A, input BN 618N, or any combination thereof, and macro building object N 610N may comprise input N1 620A, input NN 620N, or any combination thereof. In an embodiment each macro building object 610 may comprise any number of inputs, such as, for example, 0 to N inputs.

In an embodiment, each respective input of a macro building object 610 may prompt information for a macro to be built. This information may include commands to be executed, text to be written, alerts to be created, alerts to trigger, the conditions for when the macro may be executed, or any combination thereof, to name a few non-limiting examples. For example, macro building object A 410A may comprise input A1 616A encompassing a prompt for information of what text may be written by the macro and input AN 616N encompassing a prompt for information of the conditions for which the macro is to be executed.

According to an embodiment, GUI 402 may receive interactions with macro building objects 610 from interaction device 302. These interactions may include mouse clicks, mouse drags, gestures on a touch screen, swipes, voice commands, text commands, scripts, typing, insertion of text, or any combination thereof, to name a few non-limiting examples. GUI 402 may send the received interactions with the macro building objects 610 to macro construction engine 612. For example, GUI 402 may receive an interaction with macro building object B 610B as text inserted into input B1 618A. GUI 402 may then send the text inserted into input B1 618A to macro construction engine 612.

In an embodiment, macro construction engine 612 may compile a macro from the interactions received from GUI 402. Macro construction engine 612 may include a macro builder, compiler, decompiler, debugger, or any combination thereof, to name a few non-limiting examples. In an embodiment, macro construction engine 612 may construct macros in any computer language such as C, C++, C#, Objective-C, Java, Swift, Go, Ruby, Perl, Python, JavaScript, Visual Basic, WebAssembly, or any combination thereof, to name a few non-limiting examples. For example, macro construction engine 612 may receive interactions from GUI 402 including, for example, text inserted into input B1 618A (prompting text to be created by a macro) and input BN 618N (prompting the conditions for the macro to be executed).

According to an embodiment, macro construction engine 612 may store any created macros in any constructed macros in macro repository 614. Macro repository 614 may include a random access memory (RAM), read-only memory (ROM), electronically erasable programmable random access memory (EEPROM), hard disk drive (HDD), solid state drive (SSD), or any combination thereof, to name a few non-limiting examples. According to an embodiment, constructed macros stored in macro repository 614 may be queried, recalled, edited, deleted, or any combination thereof, from macro repository 614.

Figure 7:
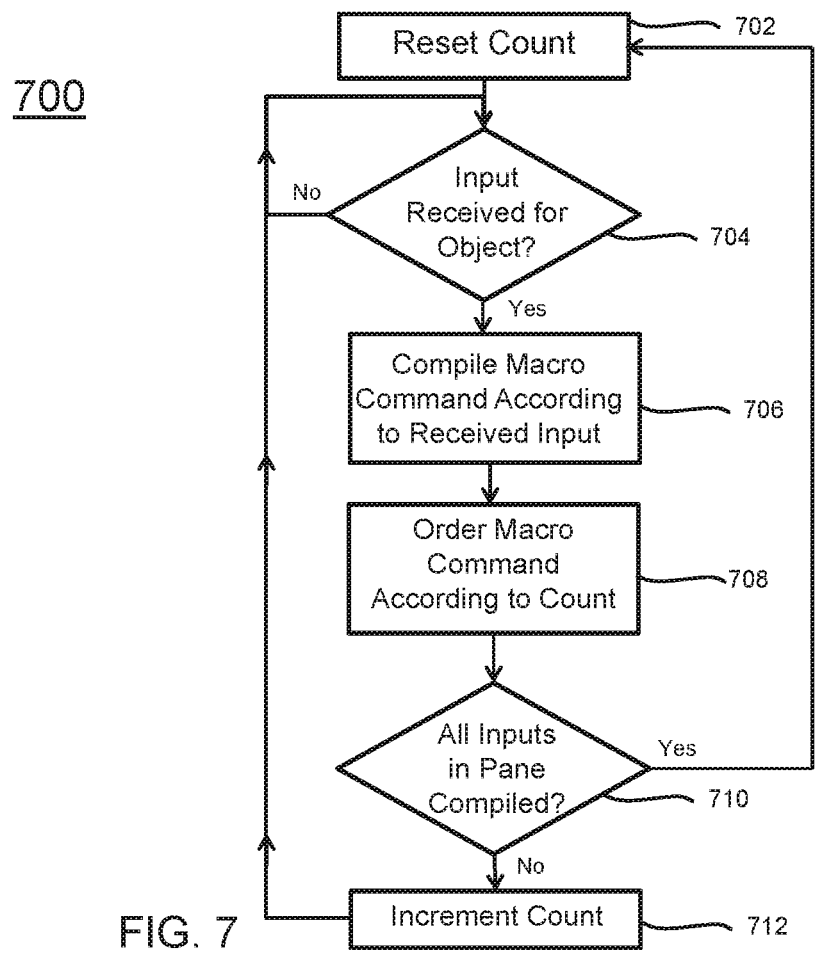
FIG. 7 is a flowchart illustrating a process for ordered interactive macro building, according to an embodiment.

FIG. 7 is a flowchart illustrating a process for interactive ordered macro building, according to an embodiment.

At 702, a count may be reset, or set to zero (0), in an example embodiment. This count may encompass a place in an order for which macro commands compiled by macro construction engine 612 are to be executed when the entirety of the macro is executed. As an example, a macro command associated with a count of 0 may be first to be executed, a count of 1 may be the second to be executed, and a count of N−1 may be N in the order.

At 704, the system may check to see if an interaction with a macro building object 610 has been received from interaction device 302. If no interaction has been received then 702 may be repeated; otherwise the execution may then advance to 706. For example, GUI 402 may receive an interaction with macro building object A 610 A as text inserted into input A1 616A. As an interaction with a macro building object 610 has been received, execution may then advance to 704.

At 706, macro construction engine 612 may compile a command for a macro according to the interactions received from GUI 402. A macro command may encompass a command to be executed when the entirety of a macro is executed. The command may be compiled into any computer language such as C, C++, C#, Objective-C, Java, Swift, Go, Ruby, Perl, Python, JavaScript, Visual Basic, WebAssembly, or any combination thereof, to name a few non-limiting examples. For example, macro construction engine 612 may receive interactions from GUI 402 including text inserted into input A1 616A (prompting text to be inserted into an email) and input AN 616N (prompting conditions for the macro command to be executed), macro construction engine 612 may then compile a command, e.g., for a macro encompassing text to be inserted into an e-mail when certain conditions are met according to the text inserted into input A 616A and input N 616N.

At 708, the compiled command may be assigned an order according to the count. For example, construction engine 612 may receive interactions from GUI 402 including text inserted into input A1 616A (prompting text to be inserted into an email) and input AN 616N (prompting conditions for the macro command to be executed). Macro construction may compile a macro command according to the received interactions and assign them an order to be executed based on the count, which may, for example, be 0, for the first command to be executed, 1 for the second command to be executed, and so on, through N−1 for the Nth or last command to be executed, in an embodiment.

At 710, the system may check whether interactions have been received for every macro building object 610 displayed within macro building pane 608. If the system has received interactions for all the macro building objects displayed within macro building pane 608, execution may go back to 702, saving the recorded macro into storage and resetting the count for the next macro to be recorded, in an embodiment. Otherwise, if the system determines that not all inputs have been received, execution may then go to 712. For example, macro construction engine 612 may receive interactions from GUI 402 for macro building object A 610A and macro building object N 610N but not for macro building object B 610B. In this example, execution may then advance to 712.

At 712, the count is increased by one, and execution may then revert back to 704.

The fillable form contract example described above may be built and used per this embodiment, provided that the order of each instruction and operation is properly specified. Any validation process as described above may ensure the proper order of these operations.

Another different example may encompass a semi-automated e-mail composer macro. One instruction may include operations to insert text into the body of an e-mail message. There may be included a component comprising predetermined or preselected text, such as formal greetings, closings, etc. Such snippets of canned text, as understood in the art, may be customized at least in part based on certain other data, such as gender, age, title, relationship, or other parameters of the intended recipient, for example.

A further instruction in the e-mail composer macro example may include an operation to reference, copy, excerpt, and/or paraphrase text or other content from an external source, such as a specified article or file. The order of this operation with respect to the use of canned text such as greetings and/or closings in an e-mail may not necessarily cause any data dependencies that would result in the specific order that may be required in the form contract example. A user may then specify an order of these operations instead based on any additional opportunities that may be afforded for custom user input at the time a macro is run (replayed), such as to allow for further customization of greetings or closings, or of the content from the external source.

Another feature, in some embodiments, may be to allow the macro builder to compile instructions across any number of applications within a platform or environment, potentially across multiple different or disparate interfaces. For example, in the e-mail composer macro example immediately above, the macro instructions may span at least an e-mail client and at least one of a web browser, document viewer, and/or content repository, any of which may provide the content to be inserted into the e-mail to be composed.

In another business-oriented use case, for example, a macro may be extended to send a notification, update a corresponding case, dispatch a technician to a worksite, create a record, prompt another action, and send e-mails), as one non-limiting example, spanning half a dozen separate applications in a platform, each having different functionality. Such flexibility and extensibility allows distinct advantages over conventional macro programming alternatives that would otherwise be limited or constrained to hard-coded fields or functions within a given application.

Figure 8:
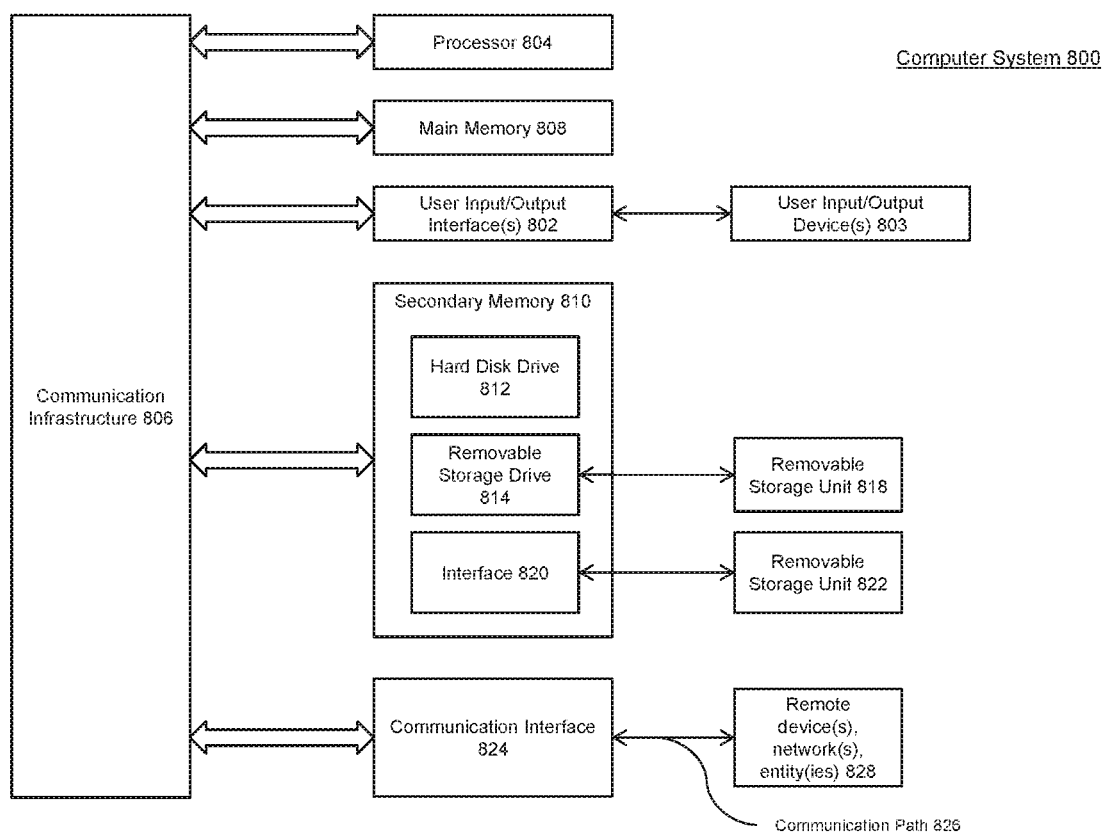
FIG. 8 is an example computer system useful for implementing various embodiments.

Various embodiments may be implemented, for example, using one or more well-known computer systems, such as computer system 800 shown in FIG. 8. Computer system 800 may be any well-known computer capable of performing the functions described herein.

Computer system 800 includes one or more processors (also called central processing units, or CPUs), such as a processor 804. Processor 804 may be connected to a bus or communication infrastructure 806.

One or more processors 804 may each be a graphics processing unit (GPU). In an embodiment, a GPU may encompass a processor that may be a specialized electronic circuit designed to process mathematically intensive applications. The GPU may have a parallel structure that may be efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a primary or main memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a disk drive, tape drive, nonvolatile memory (NVM), and/or any other storage/backup device/drive.

Removable storage drive 814 may interact with a removable storage unit 818. Removable storage unit 818 includes a computer usable or readable storage device having stored thereon computer software (control logic) and/or data. Removable storage unit 818 may be a magnetic and/or optical storage disk or tape, memory card, and/or any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a network on communication interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Additionally, configuration information and changes thereto may be generated by users, machines, or programs, using any number of interfaces such as APIs, protocols, or user tools, including text editors, web-based configuration front-ends, graphical configurators, voice input, environment sensors, etc.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

The data, files, and/or databases may be stored, retrieved, accessed, and/or transmitted in human-readable formats such as numeric, textual, graphic, or multimedia formats, as well as various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Swift, Go, Ruby, Perl, Python, JavaScript, Visual Basic, WebAssembly, or virtually any other language, with any other libraries or schemas, in any kind of framework, runtime environment, virtual machine, interpreter, stack, engine, or similar mechanism, including but not limited to Node.js, V8, jQuery, Dojo, Dijit, OpenUI5, AngularJS, Express.js, Backbone.js, Ember.js, DHTMLX, React, .NET, Electron, among many other non-limiting examples.

Based on the teachings contained in this disclosure, it will be apparent to persons skilled in the relevant art(s) how to make and use embodiments of the invention using data. processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, blocks, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:

displaying, by at least one processor and via a user interface (UI), at least an information pane and a macro-building (MB) pane, wherein the information pane comprises a first UI object displaying data of a first data type, a second UI object displaying data of a second data type, and a third UI object;

populating, by the at least one processor, the MB pane with MB objects comprising a first MB object associated with the first UI object, a second MB object associated with the second UI object, and a third MB object associated with the third UI object, wherein the first MB object is populated in the MB pane via a first event handler in response to the first UI object receiving a first UI interaction, wherein the second MB object is populated in the MB pane via a second event handler in response to the second UI object receiving a second UI interaction, wherein the first UI interaction is of a first type of UI interaction, wherein the second UI interaction is of a second type of UI interaction different from the first type of UI interaction, and wherein the first MB object, the second MB object, and the third MB object are displayed within the MB pane in a first order;

displaying, by the at least one processor, a first prompt for a string and a condition for inserting the string into a data item of the first data type;

storing the string and the condition in the first MB object;

compiling, by the at least one processor, a macro based on the first MB object, the second MB object, and the third MB object, wherein the first MB object corresponds to a first application, wherein the second MB object corresponds to a second application, wherein the first application has a first functionality, wherein the second application has a second functionality that is different from the first functionality, wherein the compiling the macro comprises at least one serialization operation performed while the first UI object, the second UI object, and the third UI object are being displayed via the UI and before the macro is committed to persistent storage, and wherein the compiling the macro further comprises:

compiling a first command for the first MB object based on the string and the condition;

assigning an execution order to the compiled first command based on a count;

increasing the count in response to determining that an MB interaction has not been received for the second MB object;

compiling a second command for the second MB object after receiving the interaction for the second MB object; and assigning an execution order to the compiled second command based on the count:

identifying, by the at least one processor, an existing function as coinciding with the macro, wherein the existing function comprises a known function in the UI;

determining, by the at least one processor, that a part of the macro is out of order with respect to a data dependency; and reloading, by the at least one processor, the MB pane, wherein the reloaded MB pane comprises interactive guidance with at least a presentation comprising the first MB object, the second MB object, and the third MB object displayed in a second order based on the data dependency, and wherein the reloading is performed dynamically in response to the determining that the part of the macro is out of order with respect to the data dependency.

2. The method of claim 1, wherein the first MB object and the second MB object are displayed within the MB pane in the second order based at least in part on at least one of the first UI interaction and the second UI interaction.

3. The method of claim 1, further comprising:
serializing, by the at least one processor, a plurality of instructions that form the macro, wherein each instruction comprises at least one action.

4. The method of claim 3, further comprising:
storing, by the at least one processor, the plurality of instructions that form the macro, wherein the plurality of instructions is saved to the persistent storage in a format different from the serializing.

5. The method of claim 1, further comprising:
generating, by the at least one processor, an indication corresponding to the identifying the existing function as coinciding with the macro, wherein the indication comprises an instruction to a user, via the UI, to use the existing function instead of the macro.

6. The method of claim 1, wherein:
the first data type is email,
the second data type is contact information, and
the third UI object displays event alerts.

7. The method of claim 1, wherein:
the first application is an email client,
the second application is a web browser.

8. A system, comprising:
a memory; and
at least one processor coupled to the memory and configured to perform operations comprising:
displaying, via a user interface (UI), at least an information pane and a macro-building (MB) pane, wherein the information pane comprises a first UI object displaying data of a first data type, a second UI object displaying data of a second data type, and a third UI object;

populating the MB pane with MB objects comprising a first MB object associated with the first UI object, a second MB object associated with the second UI object, and a third MB object associated with the third UI object, wherein the first MB object is populated in the MB pane via a first event handler in response to the first UI object receiving a first UI interaction, wherein the second MB object is populated in the MB pane via a second event handler in response to the second UI object receiving a second UI interaction, wherein the first UI interaction is of a first type of UI interaction, wherein the second UI interaction is of a second type of UI interaction different from the first type of UI interaction, and wherein the first MB object, the second MB object and the third MB object are displayed within the MB pane in a first order;

displaying a first prompt for a string and a condition for inserting the string into a data item of the first data type;

storing the string and the condition in the first MB object;

compiling a macro based on the first MB object, the second MB object, and the third MB object, wherein the first MB object corresponds to a first application, wherein the second MB object corresponds to a second application, wherein the first application has a first functionality, wherein the second application has a second functionality that is different from the first functionality, wherein the compiling the macro comprises at least one serialization operation performed while the first UI object, the second UI object, and the third UI object are being displayed via the UI and before the macro is committed to persistent storage, and wherein the compiling the macro further comprises:
compiling a first command for the first MB object based on the string and the condition;
assigning an execution order to the compiled first command based on a count:
increasing the count in response to determining that an MB interaction has not been received for the second MB object;
compiling a second command for the second MB object after receiving the interaction for the second MB object; and
assigning an execution order to the compiled second command based on the count;

identifying an existing function as coinciding with the macro, wherein the existing function comprises a known function in the UI;

determining that a part of the macro is out of order with respect to a data dependency; and reloading the MB pane, wherein the reloaded MB pane comprises interactive guidance with at least a presentation comprising the first MB object, the second MB object, and the third MB object displayed in a second order based on the data dependency, and wherein the reloading is performed dynamically in response to the determining that the part of the macro is out of order with respect to the data dependency.

9. The system of claim 8, wherein the first MB object and the second MB object are displayed within the MB pane in the second order based at least in part on at least one of the first UI interaction and the second UI interaction.

10. The system of claim 8, the operations further comprising:
serializing a plurality of instructions that form the macro, wherein each instruction comprises at least one action.

11. The system of claim 10, the operations further comprising:
storing the plurality of instructions that form the macro, wherein the plurality of instructions is saved to the persistent storage.

12. A non-transitory computer-readable storage medium having instructions stored thereon that, when executed by at least one computing device, causes the at least one computing device to perform operations comprising:
displaying, via a user interface (UI), at least an information pane and a macro-building (MB) pane, wherein the information pane comprises a first UI object displaying data of a first data type, a second UI object displaying data of a second data type, and a third UI object;
populating the MB pane with MB objects comprising a first MB object associated with the first UI object, a second MB object associated with the second UI object, and a third MB object associated with the third UI object,
wherein the first MB object is populated in the MB pane via a first event handler in response to the first UI object receiving a first UI interaction,
wherein the second MB object is populated in the MB pane via a second event handler in response to the second UI object receiving a second UI interaction,
wherein the first UI interaction is of a first type of UI interaction,
wherein the second UI interaction is of a second type of UI interaction different from the first type of UI interaction, and
wherein the first MB object, the second MB object, and the third MB object are displayed within the MB pane in a first order;
displaying a first prompt for a string and a condition for inserting the string into a data item of the first data type;
storing the string and the condition in the first MB object;
compiling a macro based on the first MB object, the second MB object, and the third MB object, wherein the first MB object corresponds to a first application, wherein the second MB object corresponds to a second application, wherein the first application has a first functionality, wherein the second application has a second functionality that is different from the first functionality, and
wherein the compiling the macro comprises at least one serialization operation performed while the first UI object, the second UI object, and the third UI object are being displayed via the UI and before the macro is committed to persistent storage, and
wherein the compiling the macro further comprises:
compiling a first command for the first MB object based on the string and the condition;
assigning an execution order to the compiled first command based on a count;
increasing the count in response to determining that an MB interaction has not been received for the second MB object;
compiling a second command for the second MB object after receiving the interaction for the second MB object; and
assigning an execution order to the compiled second command based on the count:
identifying an existing function as coinciding with the macro, wherein the existing function comprises a known function in the UI;
determining, that a part of the macro is out of order with respect to a data dependency; and
reloading the MB pane, wherein the reloaded MB pane comprises interactive guidance with at least a presentation comprising the first MB object, the second MB object, and the third MB object displayed in a second order based on the data dependency, and wherein the reloading is performed dynamically in response to the determining that the part of the macro is out of order with respect to the data dependency.

13. The non-transitory computer-readable storage medium of claim 12, wherein the first MB object and the second MB object are displayed within the MB pane in the second order based at least in part on at least one of the first interaction and the second interaction.

14. The non-transitory computer-readable storage medium of claim 12, serializing a plurality of instructions that form the macro, wherein each instruction comprises at least one action.

15. The non-transitory computer-readable storage medium of claim 14, the operations further comprising:
storing the plurality of instructions that form the macro, wherein the plurality of instructions is saved to persistent storage in a format different from the serializing.

16. The non-transitory computer-readable storage medium of claim 12, the operations further comprising:
generating an indication corresponding to the identifying the existing function as coinciding with the macro, wherein the existing function comprises a known function in the UI, wherein the indication comprises an instruction to a user, via the UI, to use the existing function instead of the macro.

\* \* \* \* \*